US009729774B2

(12) United States Patent
Ueda

(10) Patent No.: US 9,729,774 B2
(45) Date of Patent: Aug. 8, 2017

(54) IMAGING DEVICE, AUTOFOCUS METHOD AND PROGRAM OF THE SAME

(71) Applicant: Sony Corporation, Tokyo (JP)

(72) Inventor: Hitoshi Ueda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 389 days.

(21) Appl. No.: 13/664,669

(22) Filed: Oct. 31, 2012

(65) Prior Publication Data

US 2013/0162784 A1    Jun. 27, 2013

(30) Foreign Application Priority Data

Dec. 21, 2011 (JP) ................................. 2011-279579

(51) Int. Cl.
*H04N 5/232* (2006.01)
*H04N 13/02* (2006.01)

(52) U.S. Cl.
CPC ..... *H04N 5/23212* (2013.01); *H04N 13/0239* (2013.01); *H04N 13/0296* (2013.01)

(58) Field of Classification Search
CPC ........... H04N 13/0217; H04N 13/0207; H04N 13/0257; H04N 13/0271; H04N 5/23212; H04N 13/0239; H04N 9/045; H04N 5/2254; H04N 13/0022; H04N 13/021; H04N 13/0232; H04N 5/3696; H04N 13/0203; H04N 13/0225; H04N 13/0253; H04N 5/222; G03B 35/00; G02B 7/28
USPC .............................. 348/49, E05.045, E13.074
See application file for complete search history.

(56) References Cited

U.S. PATENT DOCUMENTS

| 5,825,340 | A | * | 10/1998 | Torizuka | G02B 27/017 345/8 |
| 2002/0085219 | A1 | * | 7/2002 | Ramamoorthy | G06T 15/10 358/1.9 |
| 2003/0156215 | A1 | * | 8/2003 | Chiu | H04N 5/23212 348/345 |

(Continued)

FOREIGN PATENT DOCUMENTS

| JP | 2671491 | 7/1997 |
| JP | 10-213737 | 8/1998 |

(Continued)

OTHER PUBLICATIONS

Japanese Office Action mailed Sep. 29, 2015 in Japanese Patent Application No. 2011-279579 with translation.

(Continued)

*Primary Examiner* — Jay Patel
*Assistant Examiner* — Marnie Matt
(74) *Attorney, Agent, or Firm* — Oblon, McClelland, Maier & Neustadt, L.L.P.

(57) ABSTRACT

An imaging device includes a first imaging optical system; a first imaging unit that converts an optical image of a subject formed via the first imaging optical system into an electrical signal and produces an image signal of a first imaged image; a second imaging optical system; a second imaging unit that converts an optical image of the subject formed via a second imaging optical system into an electrical signal and produces an image signal of a second imaged image; and a control unit that independently control the first imaging optical system and the second imaging optical system and performs individually a focus adjustment of the first imaged image and the second imaged image.

12 Claims, 8 Drawing Sheets

(56) References Cited

U.S. PATENT DOCUMENTS

| | | | | |
|---|---|---|---|---|
| 2003/0210329 | A1* | 11/2003 | Aagaard | H04N 7/181 348/159 |
| 2005/0053274 | A1* | 3/2005 | Mayer | G03B 21/18 382/154 |
| 2005/0207486 | A1* | 9/2005 | Lee | H04N 13/0239 375/240.01 |
| 2006/0152604 | A1* | 7/2006 | Ishikawa | H04N 5/232 348/240.99 |
| 2006/0244907 | A1* | 11/2006 | Simmons | G02C 7/16 351/159.26 |
| 2007/0024738 | A1* | 2/2007 | Kanai | G02B 7/34 348/335 |
| 2008/0084484 | A1* | 4/2008 | Ochi | G03B 13/02 348/222.1 |
| 2009/0135292 | A1* | 5/2009 | Muramatsu | G03B 13/18 348/349 |
| 2009/0153649 | A1* | 6/2009 | Hirooka | H04N 5/23212 348/47 |
| 2009/0160931 | A1* | 6/2009 | Pockett | H04N 13/0018 348/42 |
| 2011/0012998 | A1* | 1/2011 | Pan | H04N 5/23212 348/47 |
| 2011/0228053 | A1* | 9/2011 | Aoki | H04N 5/23212 348/49 |
| 2013/0021517 | A1* | 1/2013 | Ui | H04N 5/3696 348/345 |
| 2013/0093856 | A1* | 4/2013 | Uchida | G02B 7/285 348/47 |

FOREIGN PATENT DOCUMENTS

| | | |
|---|---|---|
| JP | 2006-55291 | 3/2006 |
| JP | 2010-145771 | 7/2010 |
| JP | 2011-75675 | 4/2011 |
| JP | 2011-128623 | 6/2011 |
| WO | WO2011/152168 | 12/2011 |
| WO | WO 2011152168 A1 * 12/2011 | ............ G02B 7/285 |

OTHER PUBLICATIONS

Office Action issued in Chinese Patent Application No. 201210538754.3 dated Nov. 30, 2016 with English Translation.

* cited by examiner

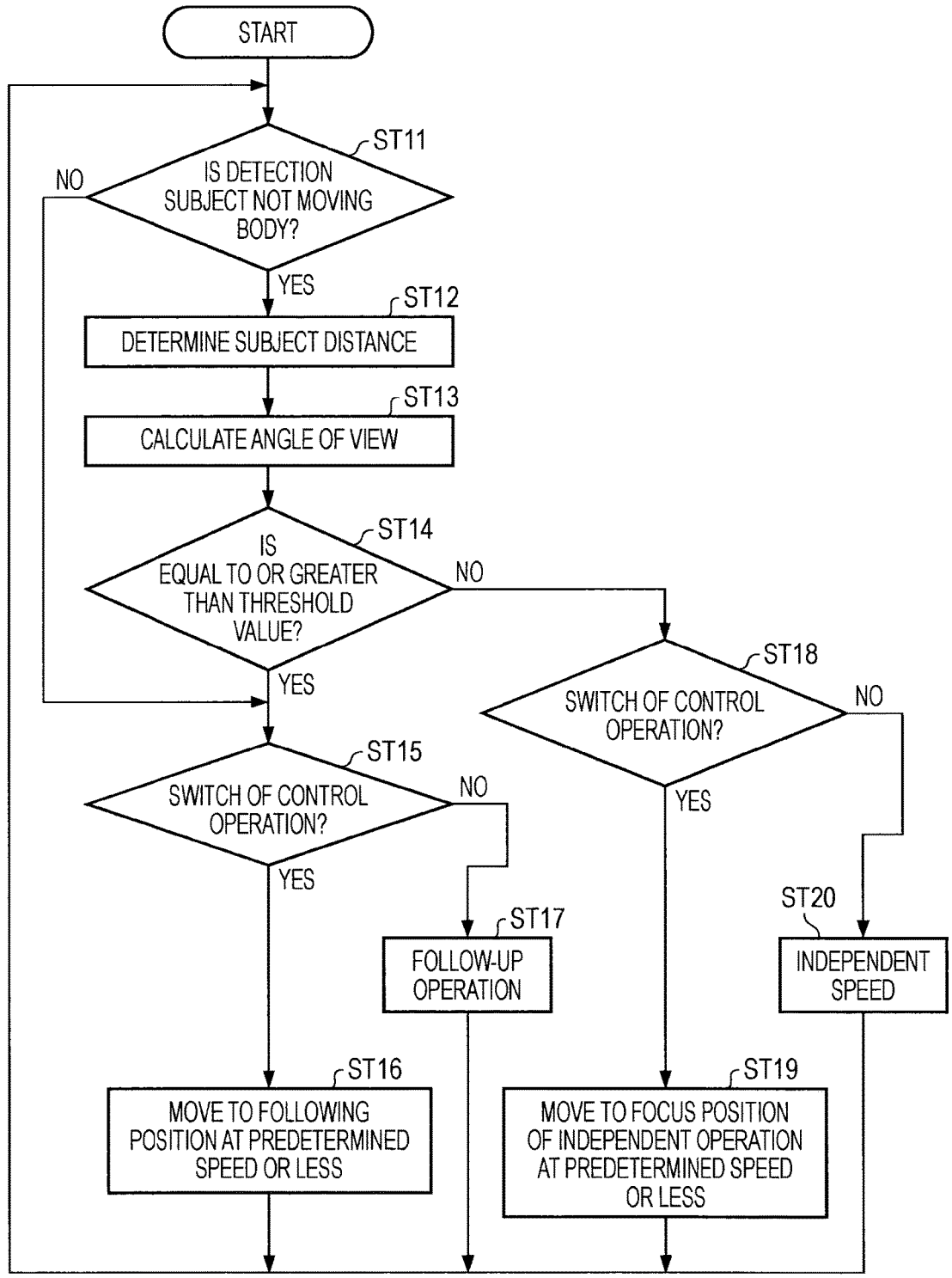

FIG. 9A
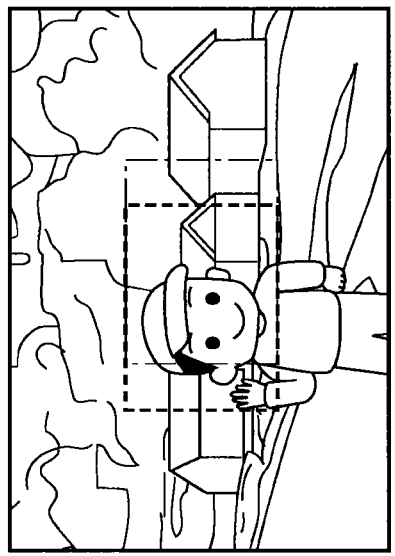
FIG. 9B
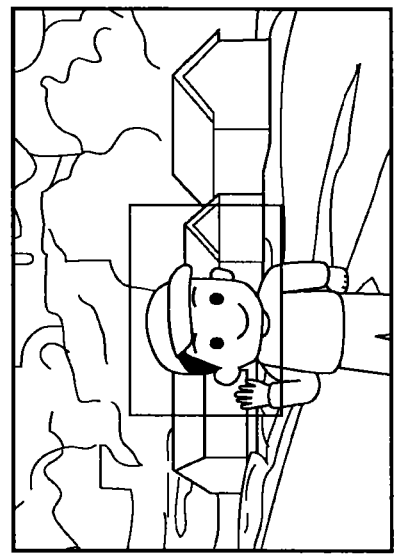

IMAGING DEVICE, AUTOFOCUS METHOD AND PROGRAM OF THE SAME

BACKGROUND

The present disclosure relates to an imaging device, an autofocus method and a program of the same. More particularly, the present disclosure relates to an imaging device for producing an image data capable of displaying a stereoscopic image without a discomfortable feeling by absorbing variation between an imaging optical system for obtaining a left eye image and an imaging optical system for obtaining a right eye image.

In the related art, a function which automatically and continuously focuses on a subject has been provided in an imaging device. For example, a technology disclosed in Japanese Unexamined Patent Application Publication No. 10-213737 determines whether contrast from image data of an imaging image is high or low and determines a focal position. In particular, a specific area of the imaged image is set as a signal acquisition area (spatial frequency extraction area) for focus control. The area is referred to as to a range-finding frame (a detection frame), which is a scheme which determines that the focus is taken if a contrast of the specific area becomes higher, and the focus is deviated if the contrast is low and drives a lens in a position in which the contrast is higher. As an autofocus scheme, two image matching scheme disclosed in Japanese Unexamined Patent Application Publication No. 2011-128623, a phase difference detection scheme disclosed in Japanese Unexamined Patent Publication No. 2671491 and the like have been used.

SUMMARY

Meanwhile, an imaging device having an imaging optical system for obtaining a left eye image and an imaging optical system for obtaining a right eye image records the left eye image and the right eye image as a pair. In addition, in order to perform stereoscopic image display without a discomfortable feeling, a focal position of the imaging optical system for the left eye image is identical with a focal position of the imaging optical system for right eye image. For example, focus control is performed in the imaging optical system for one image and the imaging optical system for the other image is controlled to follow the focal position of the imaging optical system for one image and thus the focal positions of two optical systems becomes equal. When such an autofocus control is performed, for example, in focus adjustment using a contrast, the focuses are on different subjects in the left and right images due to a difference in the left and right images due to parallax, and it is possible to prevent stereoscopic image display having the discomfortable feeling. However, when variation occurs in characteristics of the imaging optical system for one image and the imaging optical system for the other image, there is a concern that the focus becomes blurred in the other image if the imaging optical system for the other image follows the focal position of the imaging optical system for one image. In addition, when characteristics of the imaging optical systems of one image and the other image have to be adjusted, it is difficult to efficiently produce imaging devices because of such an adjustment time.

Therefore, it is desirable to provide an imaging device and an autofocus method, and a program capable of producing the image data making a stereoscopic image display possible without the discomfortable feeling by absorbing the variation of the imaging optical system for the left eye image and the imaging optical system for the right eye image.

According to an embodiment of the present disclosure, there is provided an imaging device including: a first imaging optical system; a first imaging unit that converts an a first optical image of a subject formed via the first imaging optical system into an electrical signal and produces an image signal of a first imaged image; a second imaging optical system; a second imaging unit that converts a second optical image of the subject formed via the second imaging optical system into an electrical signal and produces an image signal of a second imaged image; and a control unit that independently controls the first imaging optical system and the second imaging optical system and individually performs focus adjustment of the first imaged image and the second imaged image.

According to the embodiment of the present disclosure, the subject optical image formed via the first imaging optical system may be converted into the electrical signal in the first image unit and the image signal of the first imaged image is generated. The subject optical image formed via the second imaging optical system is converted into the electrical signal in the second imaging unit and the image signal of the second imaged image is generated. Further, for example, when the distances of the subject between the first imaged image and the second imaged image are equal to or greater than a predetermined distance corresponding to a focus distance, the control unit independently controls the first imaging optical system and the second imaging optical system to individually performs a focal adjustment of the first imaged image and the second imaged image. When focal adjustment is individually performed, based on the focal position of one imaged image, the control unit may set a focus adjustment range of the other imaged image to perform the focus adjustment. Further, when the subjects distances of the first imaged image and the second imaged image are not equal to or greater than a predetermined distance corresponding to the focus distance, the focus adjustment of the second imaged image may be switched from independent control to a control following the focus adjustment of the first imaged image. Herein, when focus adjustment of the second imaged image is switched between independent control and a control following the focus adjustment of the first imaged image, the focal position is moved from the focal position of one control to the focal position of the other control at a predetermined speed or lower.

In addition, the imaging device may further include a subject recognition unit that performs the subject recognition based on the image signal of the first imaged image, in which when the control unit causes the focus to follow a predetermined subject recognized by the subject recognition unit, control following the focus adjustment of a first imaged image may be performed. In addition, the control unit may adjust a position of any of at least a first detection area and a second detection area for every focus distance such that the subject range is coincident in an image of the first detection area used in adjusting the focus in the first imaged image and the image of the second detection are used in adjusting the focus in the second imaged image.

According to another embodiment of the present disclosure, there is provided an autofocus method including: converting an optical image of a subject formed via the first imaging optical system into an electrical signal in the first imaging unit and producing an image signal of a first imaged image; converting the optical image of the subject formed via the second imaging optical system into an electrical signal in a second imaging unit and producing an image signal of a second imaged image; and independently controlling the first imaged optical system and the second imaged optical system and individually performing a focus adjustment of the first imaged image and the second imaged image.

According to still another embodiment of the present disclosure, there is provided a program causing a computer to execute an autofocus control including: independently controlling a first imaging optical system and a second imaging optical system; converting an optical image of a subject formed via the first imaging optical system into an electrical signal in a first imaging unit to obtain a first imaged image and an optical image of the subject formed via a second imaging optical system into an electrical signal in a second imaging unit to obtain a second imaged image; and performing individually a focus adjustment of the first imaged image and the second image.

In addition, the program of the embodiment of the present disclosure is, for example, a program, in which a variety of program code is executable with respect to a general purpose computer, is provided in a computer-readable format by a storage medium, or a communication medium, for example, a storage medium such as an optical disc or a magnetic disk, a semiconductor memory or a communication medium such an network. Processes corresponding to the program on the computer are realized by providing such a program in a computer-readable format.

According to the embodiment of the present disclosure, a subject optical image formed via a first imaging optical system is converted into an electrical signal in a first imaging unit to generate an image signal of a first imaged image. In addition, a subject optical image formed via a second imaging optical system is converted into an electrical signal in a second imaging unit to generate an image signal of a second imaged image. In addition, the first imaging optical system and the second imaging optical system are independently controlled to individually perform focus adjustment of the first imaged image and the second imaged image. Therefore, for example, even though the lens position in which the imaging optical system for obtaining a left eye image and an imaging optical system for obtaining a right eye image is focused generates variation, it is possible to generate image data from which stereoscopic image display is possible without a discomfortable feeling by absorbing a variation.

BRIEF DESCRIPTION OF THE DRAWINGS

FIG. 8 is a flowchart illustrating other autofocus control operation.

FIGS. 9A and 9B is a view illustrating movement of a detection area.

DETAILED DESCRIPTION OF EMBODIMENTS

Embodiments of the present disclosure will be described below. In addition, a description will be made in the following sequence.
1. First Embodiment
2. Second Embodiment
3. Third Embodiment
4. Fourth Embodiment

1. First Embodiment 1-1. Configuration of First Embodiment

Figure 1:
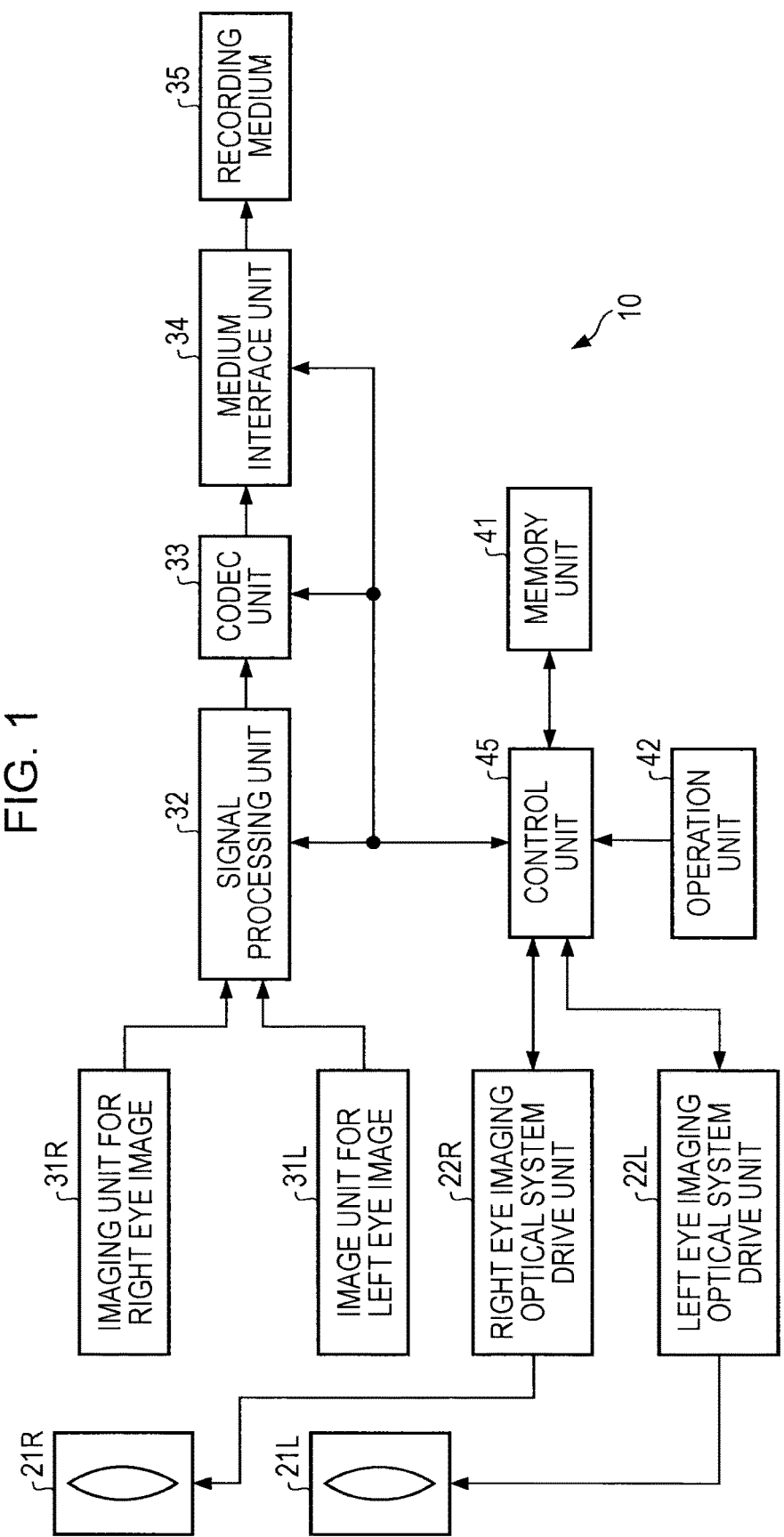
FIG. 1 is a view illustrating a configuration of an imaging device.

FIG. 1 illustrates a configuration of an imaging device an embodiment of the present disclosure. The imaging device 10 includes a left eye imaging optical system 21L for obtaining a left eye image, a right eye imaging optical system 21R for obtaining a right eye image, a left eye imaging optical system drive unit 22L, a right eye imaging optical system drive unit 22R, an imaging unit 31L for a left eye image and an imaging unit 31R for a right eye image. In addition, the imaging device 10 includes a signal processing unit 32, a codec unit 33, a medium interface unit 34 and a recording medium 35. Further, the imaging device 10 includes a memory unit 41, an operation unit 42 and a control unit 45.

The left eye imaging optical system 21L and the right eye imaging optical system 21R include an imaging lens group and an aperture mechanism, a ND mechanism for inserting a ND filter and the like. The imaging lens group includes a zoom lens and a focus lens, a shift vibration proof type hand-shake correction lens for correcting a vibration of the hands when imaging and the like. The left eye imaging optical system 21L drives the imaging lens group and the aperture mechanism, and the ND mechanism based on a driving signal supplied from the left eye imaging optical system drive unit 22L to perform a focus operation and a zoom operation, a hand vibration correction operation, a light quantity adjustment operation and the like. Similarly, the right eye imaging optical system 21R drives the imaging lens group and the aperture mechanism, the ND mechanism and the like based on a driving signal supplied from the right eye imaging optical system drive unit 22R to perform the focus operation and the zoom operation, a hand vibration correction operation, a light quantity adjustment operation and the like.

The left eye imaging optical system drive unit 22L generates a driving signal that drives the imaging lens group and the aperture of the left eye imaging optical system 21L based on a control signal from a control unit 45 described below. The left eye imaging optical system drive unit 22L outputs the generated driving signal to the left eye imaging optical system 21L.

The right eye imaging optical system drive unit 22R generates a driving signal that drives the imaging lens group and the aperture of the right eye imaging optical system 21R based on a control signal from the control unit 45. The right eye imaging optical system drive unit 22R outputs the generated driving signal to the right eye imaging optical system 21R.

An imaging unit 31L for a left eye image includes an imaging element and a noise removal unit, an A/D converter and the like. The imaging unit uses a CMOS (Complementary Metal Oxide Semiconductor) solid-state imaging element and a CCD (Charge Coupled Device) solid-state imaging element. The imaging element performs a photoelectric conversion and generates the image signal corresponding to an optical image imaged on an imaging surface by the left eye imaging optical system 21L. The noise removal unit performs, for example, a correlation double sampling process and the like with respect to the image signal generated in the imaging element and removes a noise from the image signal. In addition, the noise removal unit amplifies the image signal after noise removal at a predetermined signal level. A/D converter converts the image signal processed in the noise removal unit into a digital image signal and outputs the signal to a signal processing unit 32.

An imaging unit 31R for a right eye image has the same configuration as the imaging unit 31L for the left eye image and generates the digital image signal in response to the optical image imaged on the imaging surface of the imaging element by the right eye imaging optical system 21R and outputs the signal to the signal processing unit 32.

The signal processing unit 32 includes a white balance correction unit, a gamma correction unit, a contour correction unit and a luminance and color difference signal generation unit and the like. The signal processing unit 32 performs the white balance adjustment process and the gamma correction process, the contour correction process and the like based on the control signal from the control unit 45 with respect to the image signal supplied from the imaging unit 31L for the left eye image and the imaging unit 31R for the right eye image. In addition, for example, the signal processing unit 32 converts the image signal on which the image process is performed into the image data of the luminance and the color difference and outputs the image data to the codec unit 33.

In addition, the signal processing unit 32 may have a configuration having a subject recognition unit which recognizes the subject which causes focus to be followed by analyzing the image signal. In addition, the subject recognition unit outputs the recognized result of the subject to the control unit 45.

The codec unit 33 performs an encoding process as the stereoscopic image (three-dimensional image) using the image data of the left eye image and the image data of the right eye image and outputs the encoded data to the medium interface unit 34. In addition, the codec unit 33 performs a decoding process of the encoded data.

The medium interface unit 34 is an interface for recording the encoded data and the like on a recording medium 35 and reading an encoding data and the like recorded on the recording medium 35.

The recording medium 35 uses a flash memory, a hard disk or the like. The recording medium 35 may be built into the imaging device 10 or may be detachable. In addition, a recording medium such as an optical disc, a magneto-optical disc may be used as the recording medium 35.

The memory unit 41 stores a program for controlling operation of the imaging device 10, various data and the like.

The operation unit 42 includes a release switch, a zoom button, a switching button for performing a switching of an operation, an operation button for performing various settings and the like. The operation unit 42 generates an operation signal in response to a user operation and outputs the signal to the control unit 45.

The control unit 45 executes the program recorded in the memory unit 41 to operate the imaging device 10 according to the operation of user based on various data recorded in the memory unit 41 and an operation signal supplied from the operation unit 42 to generate a control signal and supplies the signal to respective units.

In addition, the control unit 45 uses the image signal supplied to the signal processing unit 32 to perform processes, such as an autofocus control which focuses on the subject and an auto iris control for performing brightness adjustment. The autofocus control calculates the physical quantity necessary to perform the autofocus control from the image signal. For example, when an autofocus control is performed using the contrast of the image, the focus evaluation value indicating a sharpness for the image from the image signal is calculated. The control unit 45 detects the position where the focusing evaluation value is the maximum and moves the focus lens to the position. That is, the control unit moves the focus lens from close range to infinite distance in a predetermined step to obtain the focus evaluation value at each position and thus the obtained focus evaluation value sets a maximum position as the focal position to move the focus lens to the position. In addition, the control unit 45 may switch the autofocus control operation based on the subject recognition result from the signal processing unit 32.

In addition, although not shown, the imaging device 10 includes a microphone for recording audio and a display unit for displaying through-the-lens image, a recorded image and a reproduction image and the like.

1-2. Operation of First Embodiment

Figure 2:
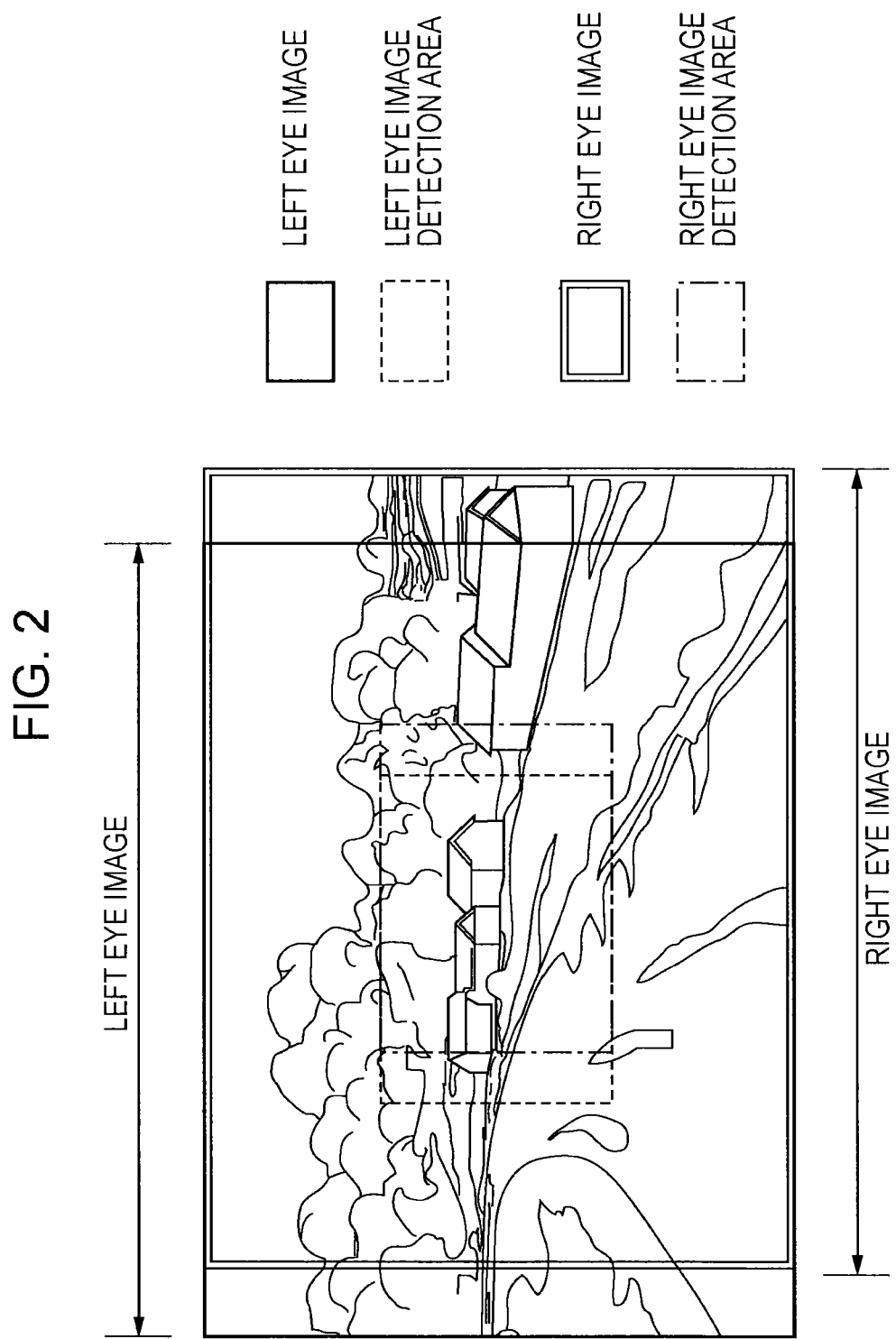
FIG. 2 is a view illustrating a left eye image and a right eye image.

When the left eye imaging optical system 21L for obtaining the left eye image and the right eye imaging optical system 21R are provided, the left eye image and the right eye image have parallax. FIG. 2 illustrates the left eye image and the right eye image. In addition, in FIG. 2, the entire image is regarded as one stereoscopic image and FIG. 2 illustrates the left eye image obtained by the left eye imaging optical system 21L and the imaging unit 31L for the left eye image and the right image obtained by the right eye imaging optical system 21R and the imaging unit 31R for the right eye image. In addition, a frame indicated by a solid line shows a left eye image and a frame indicated by a double line shows a right eye image.

In addition, in the autofocus control, when an image area (detection area) used in adjusting the focus is disposed in the middle of each imaged image, the image in the detection area becomes an image having parallax. In addition, a frame indicated by a dash line shows the left eye image detection area and a frame indicted by a dashed line shows the right eye image detection area.

Figure 3:
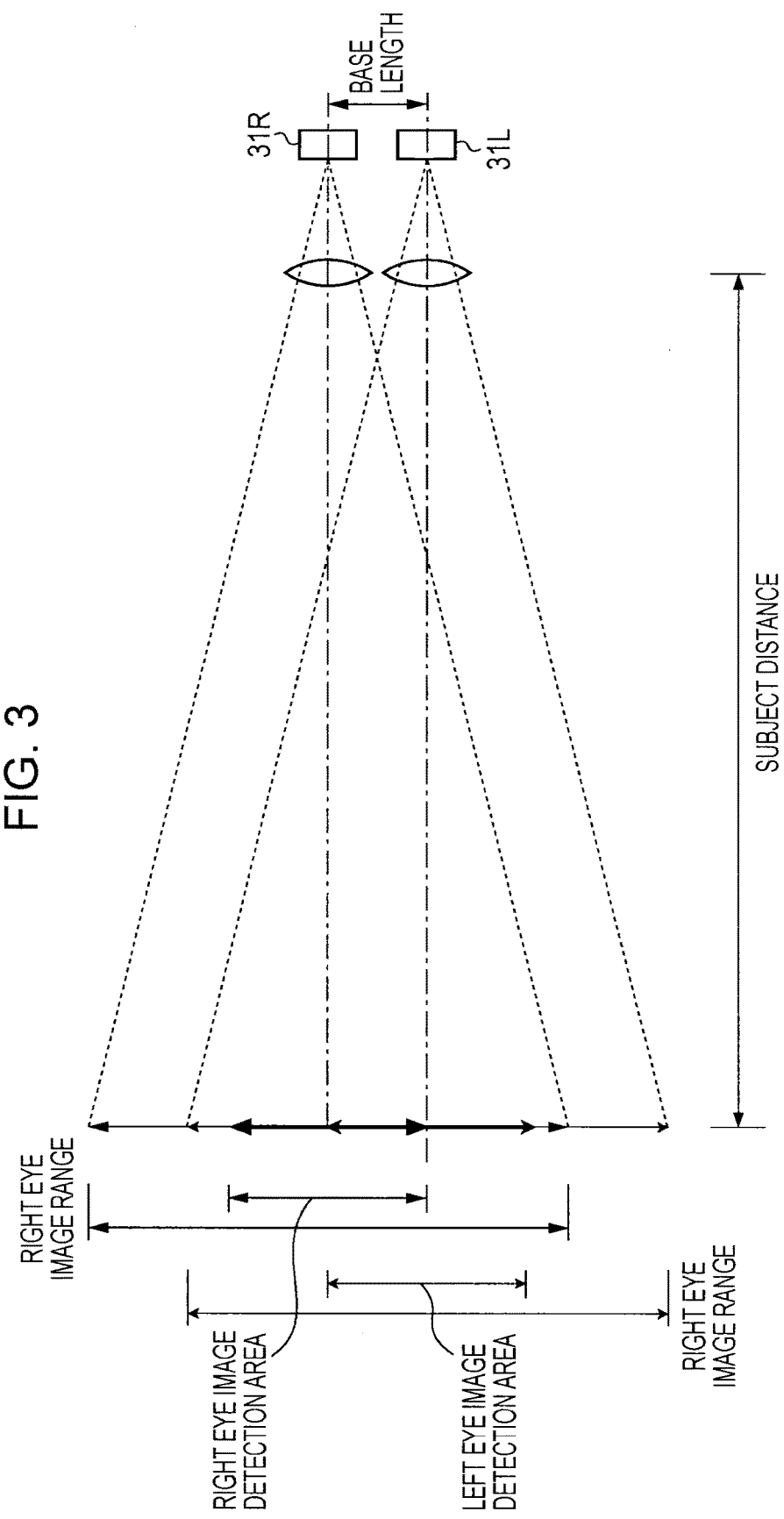
FIG. 3 is a view illustrating a parallax at a viewpoint from an imaging device.

FIG. 3 illustrates the parallax in FIG. 2 at a viewpoint from the imaging device 10. The left eye image and the right eye image in the imaging device 10 are adjusted for the left and right angles of view to be identical each other with respect to the optical axis. In addition, a base length, that is, the interval between the optical axis of the left eye imaging optical system and the optical axis of the right eye imaging optical system is fixed. Since the base length is a fixed value in the imaging device 10, the longer the distance of the subject is, the smaller the ratio of the base length with respect to the subject distance is. That is, when the ratio becomes small, the difference between the left eye image and the right eye image due to parallax becomes small and when the ratio becomes large, a difference between the left eye image and the right eye image by the parallax is noticeable.

Moreover, when a zoom operation is performed, since the subject is magnified to be displayed when the position of the zoom lens becomes a tele side, the difference between the left eye image and the right eye image due to parallax is noticeable if the zoom magnification is high. In addition, if the zoom magnification is low, the difference of the left eye image and the right eye image due to parallax becomes low. That is, the difference between the left eye image and the right eye image due to parallax in response to a focus distance is changed.

Further, when the ratio of the base length with respect to the subject distance is large, there is a concern that the focuses of the left eye image and the right eye image may be taken on different subjects when the autofocus control is independently performed on the left eye image and the right eye image. For example, when a near subject and a far subject are mixed within the imaged image angle, the autofocus control operation is performed to focus on the near subject if the image of the detection area of the left eye image is mainly the image of the near subject. In addition, if the image of the detection area of the right image is mainly the image of the far subject, the autofocus control operation is performed to focus on the far subject. Therefore, there is a concern that the left eye image becomes the image which is focused on the near subject and the right eye image becomes the image which is focused on the far subject.

Therefore, when the difference between the left eye image and the right eye image by the parallax is little by the parallax, that is, when the subject distance is equal to or greater than a predetermined distance according to the focus distance, the imaging device 10 independently performs the autofocus control operation on the left eye image and the right eye image in order for each image to focus on a desired subject. In addition, when the difference between the left eye image and the right eye image due to parallax is noticeable, that is, when the subject distance is equal to or greater than a predetermined distance according to the focus distance, the autofocus control operation is performed with respect to other image in order for the left and right eye images not to focus on different subjects and the focal position of one image follows the focal position of the one image.

In addition, the subject distance may be measured by a measurement means and may be estimated from the position of the focus lens and the zoom lens in a focused state.

Figure 4:
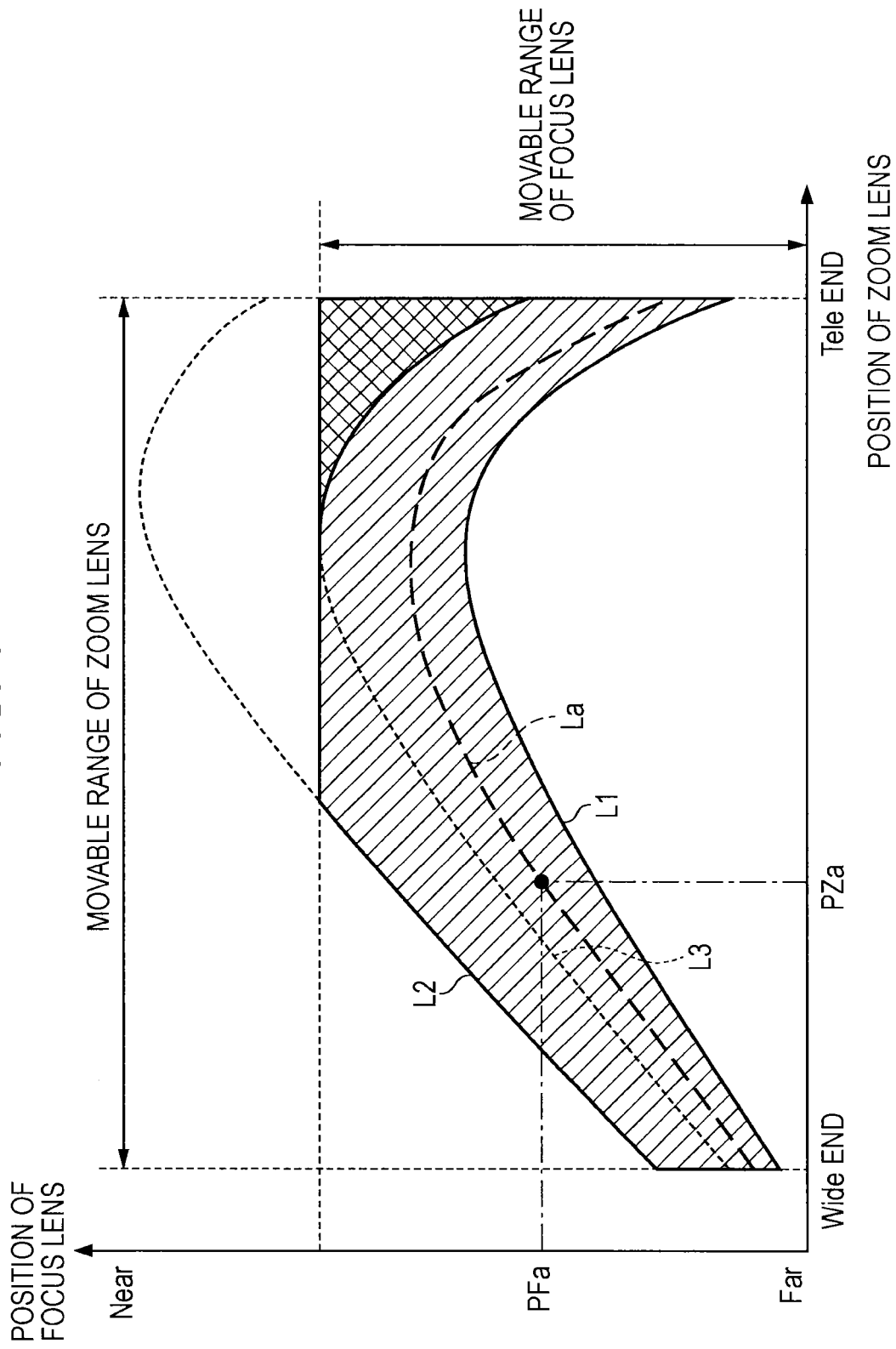
FIG. 4 is a view illustrating an operation estimating a subject distance from positions of a focus lens and a zoom lens.

FIG. 4 is a view illustrating an operation estimating the subject distance from a position of the focus lens and the zoom lens. FIG. 4 illustrates an operation area in a position space composed of the movable range of the zoom lens and the movable range of the focus lens in the imaging optical system of the imaging device 10.

In the position space, the horizontal axis shows the physically movable range of the zoom lens, the left direction (reduction direction) is set as the wide side, and the right direction (increasing direction) is set as the tele side. In addition, the vertical axis shows the physically movable range of the focus lens, and a downward direction (decreasing direction) is set as a far side and the upward direction (increasing direction) is set as the near side.

A curve L1 shows the trajectory of a combination of the zoom lens position and the focus lens position in which a subject at infinite distance is focused on. A curve L2 shows the trajectory of a combination of the zoom lens position and the focus lens position in which a subject at the shortest imaging distance is focused on. In addition, a curve L3 shows a trajectory of a combination of the zoom lens position and the focus lens position with respect to the shortest imaging distance making focus possible in the entire zoom operation area.

A normal operation area (area indicated by an oblique line) is an area surrounded by the curves L1, L2, L3 and a extreme closed-up of the focus lens. In an operation in normal mode, adjustment of the position of the zoom lens and the position of the focus lens is possible only within the area. In addition, in a case of the imaging device which is an inner focus scheme, an area (area indicated by crosshatching) of an operation of a macro mode is disposed at the tele end as illustrated.

Herein, for example, a position of the zoom lens is referred to as "PZa" and a position of the focus lens is referred to as "PFa" when the focus state is reached. In this case, an imaging distance corresponding to a trajectory La passing through a point at which a position of the zoom lens is "PZa" and the position of the focus lens is "PFa" is estimated as the subject distant Ma.

Figure 5:
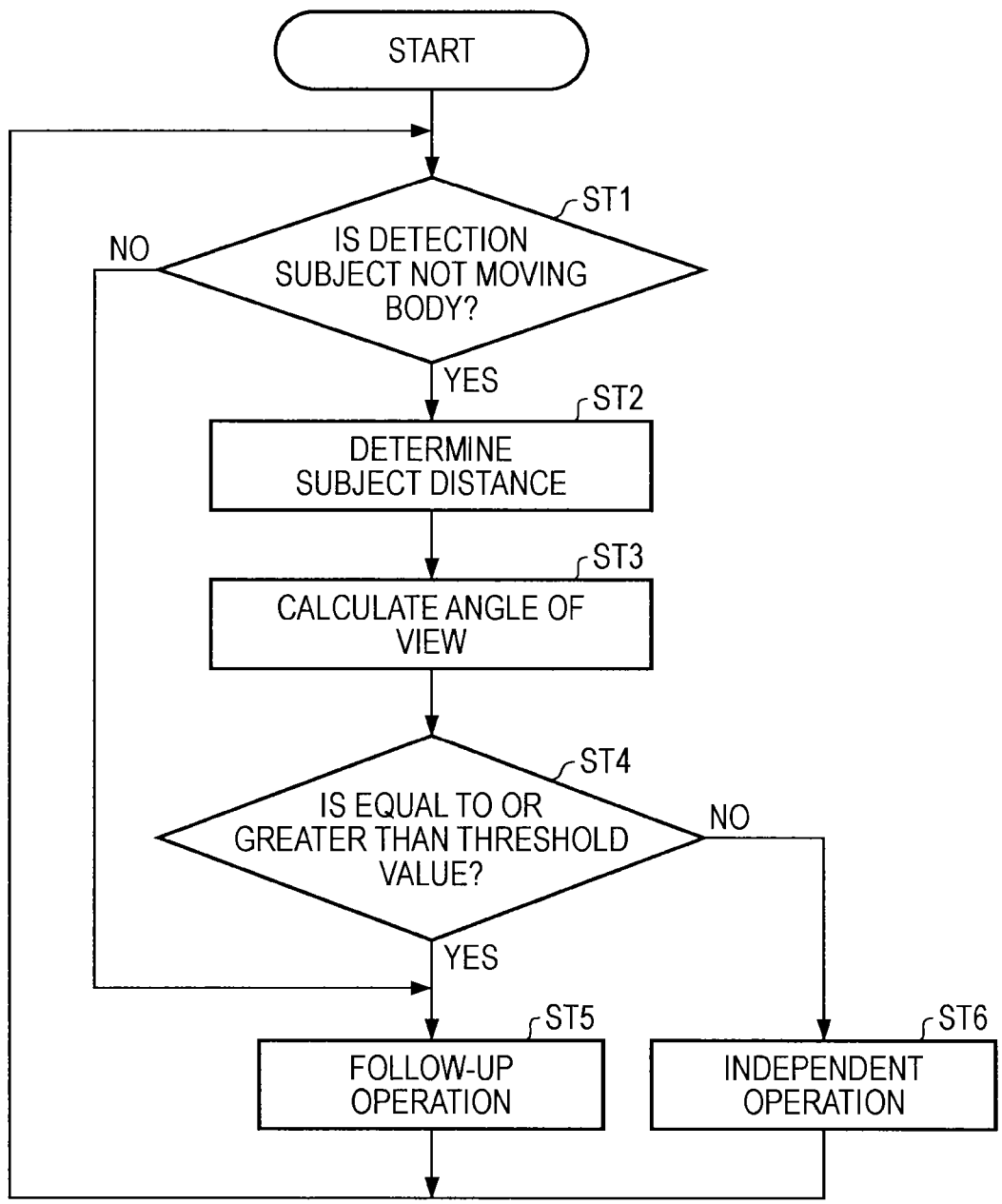
FIG. 5 is a flowchart illustrating an autofocus control operation.

FIG. 5 is a flowchart illustrating the autofocus control operation of the control unit 45. In step ST1, the control unit 45 determines whether a detection subject is a moving body or not. The control unit 45 determines whether the subject in the detection area is a moving body or not based on the subject recognition result supplied from the signal processing unit 32. The control unit 45 proceeds to step ST2 if the subject of the detection area is not a moving body. Furthermore, if the subject of the detection area is a moving body, the control unit proceeds to step ST5.

In step ST2, the control unit 45 determines the subject distance. The control unit 45, for example, as described above, estimates the subject distance Ma from the position of the focus lens and the position of the zoom lens and proceeds to step ST3.

Figure 6:
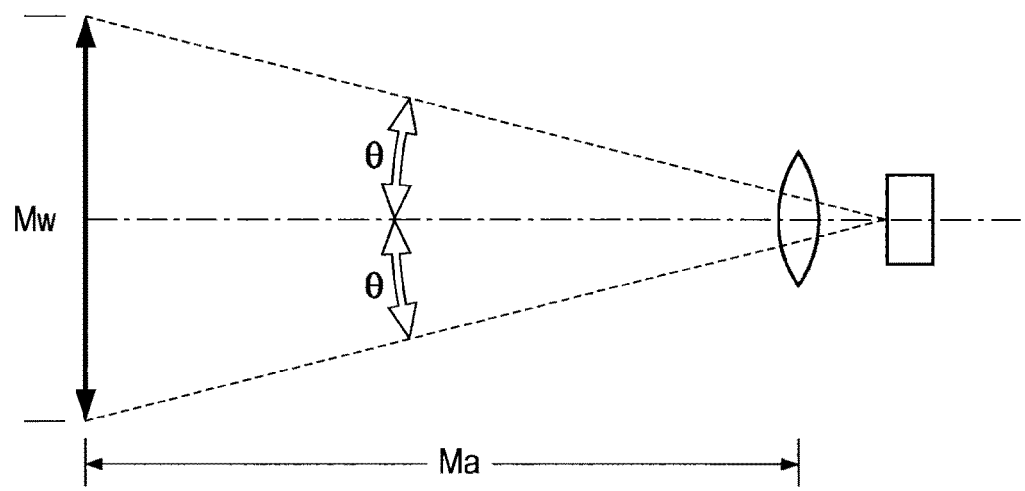
FIG. 6 is a view illustrating a range of an angle of view.

In step ST3, the control unit 45 calculates the range of the angle of view. The control unit 45 calculates the range of the angle of view Mw of the imaging optical system from the angle of view $2\theta$ and the subject distance Ma based on Equation (1) as illustrated in FIG. 6. In addition, the angle of view $2\theta$ is a unique value of the lens according to the focus distance and varies according to zoom magnification.

$$Mw = \tan\theta \times Ma \times 2 \qquad (1)$$

In step ST4, the control unit 45 determines whether a focus control determination value is equal to or greater than a threshold value or not. The control unit 45 calculates the ratio of the range Mw of the angle of view and the base length Mr based on Equation (2) and sets the ratio as a focus control determination value Qm. If the focus control determination value Qm is equal to or greater than the threshold value, the control unit 45 proceeds to step ST5 and if the value is less than the threshold value, the control unit proceeds to step ST6.

$$Qm = Mr/Mw \qquad (2)$$

In step ST5, the control unit 45 performs a follow-up operation. If the range of the angle of view with respect to the base length is not large, since the left eye image and the right eye image have a noticeable difference due to parallax, the control unit 45 performs the autofocus control operation with respect to one image and causes the focal position of the other image to follow the focal position of the one image. In addition, if the control unit 45 selects the detection area as the moving body, the detection area is generally set to be small to correctly focus on the moving body. The difference between the images due to parallax is not negligible if the detection area is set to be small as described above. In addition, if the subject as the moving body, for example, is moved to an end of a screen, there is concern that the subject is not captured in one lens. Therefore, even such a case, the control unit performs the autofocus control operation with respect to one image and causes the focal position of the other image to follow the focal position of the one image. The control unit 45 returns to step ST1 performing such an independent operation.

In step ST6, the control unit 45 performs an independent operation. Since the range of the angle of view is large with respect to the base length and the left and right eye image due to parallax has a small difference, the control unit 45 returns to step ST1, which independently performs the autofocus operation in each of the left eye image and the right eye image.

If the autofocus control operation is performed by the imaging device 10, an image signal of the left eye image and the right eye image generated in the imaging device 10 can prevent the image from being a discomfortable feeling due to difference between noticeably different focal positions. In addition, the autofocus scheme is not limited to the contrast scheme. For example, the autofocus scheme may be a 2 image matching scheme or a phase difference detection scheme.

By the way, the focus distance is changed by the zoom magnification as described above. For example, according to the zooming on the tele side, the optical angle of view becomes narrow and the proportion of the parallax for the entire screen at the same subject distance increases. Therefore, the control unit 45 may perform the setting of the autofocus control operation based on a comparison result of a predetermined distance according to the subject distance and the focus distance (corresponding to a position of zoom lens).

Figure 7:
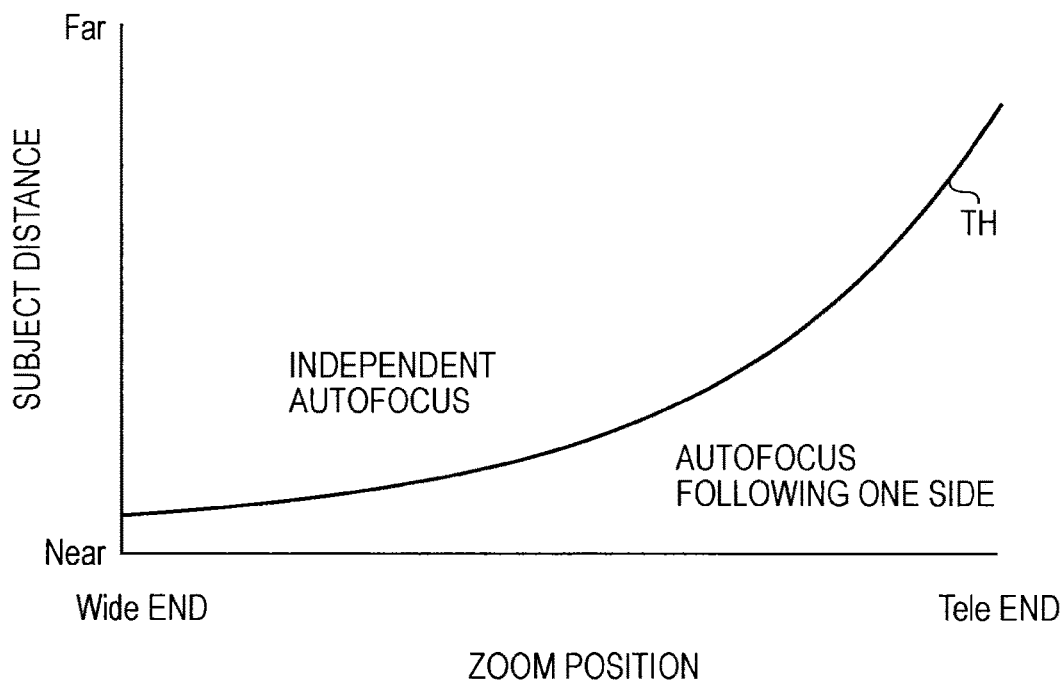
FIG. 7 is a view illustrating an autofocus control operation set in response to positions of a subject distance and a zoom lens.

FIG. 7 is a view illustrating the autofocus control operation set according to a subject distance and a position of the zoom lens. For example, the threshold value TH is set as illustrated in FIG. 7 and thus if points shown in the position of the zoom lens and the subject distance are equal to or greater than the threshold value or toward to an upper side than the threshold value, that is, if the subject distance is equal to or greater than a predetermined distance corresponding to the focus distance, the autofocus control operation is independently performed on each of the left eye image and the right eye image. In addition, if the point is an area below the threshold value, that is, if the subject distance is not equal to or greater than the predetermined distance according to the focus distance, the autofocus control operation is performed with respect to one image and the focal position of the other image follows the focal position of the one image. In this way, the autofocus control operation can be set in order to perform the stereoscopic image display without a discomfortable feeling according to the subject distance and the position of the zoom lens. In addition, since the data of the curve indicating the threshold value is uniquely determined according to the imaging optical system, the autofocus control operation can be easily set by storing the data in the memory unit 41 in advance. Further, since the base length Mr is a fixed value, the processes of the above-mentioned step ST3 and step ST4 correspond to the processes determining whether the subject distance is equal to or greater than the predetermined distance according to the focus distance.

Even if the variation is generated between the lens of the left eye imaging optical system 21L and the lens of the right eye imaging optical system 21R by performing the autofocus control operation as described above, the imaging device 10 can absorb the variation because the focus adjustment is independently performed with respect to each image. For example, even if the focal position becomes different between the lens of the left eye imaging optical system 21L and the lens of the right eye imaging optical system 21R due to temperature characteristics and the aperture, an ND correction, a flange focal length correction and the like, it is possible to set the lenses to the correct focal position for the respective images. Therefore, the image signal of the left eye image and the right eye image generated in the imaging device 10 becomes an image signal of the image focused on each desired subject. In addition, even if the characteristics of the imaging optical system are not adjusted to be coincident, the imaging device 10 can be efficiently produced because the left eye image and the right eye image are each focused on desired subject. Further, if the difference in the image is noticeable due to parallax in the left eye image and the right eye image, the autofocus control operation is performed with respect to one image and the focal position of the other image follows the focal position of one image. Therefore, since focal position is different at the left eye image position and the eye image position, it is possible to prevent the stereoscopic image display from being a discomfortable feeling. For example, the left eye image becomes an image focused on a desired subject and the right eye image is focused on a subject different from the desired subject, so that the desired subject can be prevented from becoming an image which is out of the focus.

In addition, in a first embodiment of the present disclosure, a case of detecting a moving body using subject recognition is described. However, as long as the recognized subject is a subject for which the detection area is set to be small, it is not limited to being a moving body. For example, the subject may be people detected by facial recognition and the like.

2. Second Embodiment

Next, a second embodiment will be described. In addition, the imaging device of the second embodiment of the present disclosure has the same configuration of the first embodiment of the present disclosure.

The difference in the focal position caused by the variation in a plurality of the imaging optical system is not large. Therefore, in the second embodiment of the present disclosure, the focus adjustment range of the other image is limited based on the focal position of one image in order that the focal position of one image and the focal position of the other image not be noticeably different. That is, the imaging device 10 sets the driving range of the focus lens corresponding to the other image based on the lens position of the focus lens when one image is in a focused state. In addition, the imaging device 10 detects the lens position of the focus lens in which the other image becomes the focus state within the set driving range.

As such, if the driving range of the focus lens is not limited as described above, it is possible to suppress a difference in the focal position between one image and the other image within a predetermined range according to the variation. Therefore, the focus state is largely different in the left eye image and the right eye image, so that it is possible to prevent the image from becoming a stereoscopic image display having a discomfortable feeling.

3. Third Embodiment

Next, a third embodiment of the present disclosure will be described. In addition, the imaging device of the third embodiment of the present disclosure has the same configuration of the first embodiment of the present disclosure.

When an operation which independently performs the autofocus control on each of the left eye image and right eye image and an operation in which the focal position of the other image follows the focal position of the one image are switched between, the operation is not affected by the switching operation because any of the operations are selected when imaging a still image. However, a case where the switching of the autofocus control operation is performed occurs when imaging in a moving image. Herein, if the focal position of a case where independently performs the autofocus control and the focal position following the focal position of the other image are approximately equal, even if the switching of the autofocus control operation is performed when imaging, the switching of the control operation is not noticeable in the recorded moving image. However, if the focal position of the case where the autofocus is independently performed and the focal position following the focal position of the other image are separated, influence due to switching of the control operation is noticeable the recorded moving image when the focal position is instantaneously moved and thus becomes an image with a discomfortable feeling.

Therefore, in the third embodiment of the present disclosure, if the switching of the autofocus control operation is performed, the movement of the focal position is restricted to have a predetermined speed or less and thus influence due to the switching of the control operation decreases.

FIG. 8 is a flowchart illustrating the autofocus control operation of the control unit in a third embodiment of the present disclosure. In FIG. 8, processes of step ST11 to step ST14 correspond to those of step ST1 to step ST4 illustrated in FIG. 5.

Step ST15, the control unit 45 determines whether the switching of the autofocus control operation is performed. The control unit 45 proceeds to step ST16 if the switching of the autofocus control operation is performed and proceeds to step ST17 if the switching of the autofocus control operation is not performed.

In step ST16, the control unit 45 moves the focal position to the following focal position at a predetermined speed or lower. The control unit 45 moves the focal position of the other image in the case where the autofocus control independently to the following focal position is performed, that is, the focal position of the one image at a predetermined speed or lower and returns to step ST11.

In step ST17, the control unit 45 performs the follow-up operation. The control unit 45 performs the autofocus control operation with respect to one image and allows the focal position of the other image to follow the focal position of one image and returns to step ST11.

In step ST18, the control unit 45 determines whether switching of the autofocus control operation is performed. The control unit 45 proceeds to step ST19 if the switching of the autofocus control operation is performed and proceeds to step ST20 if the switching of the autofocus control operation is not performed.

In step ST19, the control unit 45 moves the focal position to the focal position of an independent operation at a predetermined speed or lower. The control unit 45 moves the focal position of the other image following the focal position of one image to the focal position of the case independently performing the autofocus control at a predetermined speed or lower and returns to step ST11.

In step ST20, the control unit 45 performs an independent operation. The control unit 45 returns to step ST11, in which the autofocus control operation is independently performed on each of the left eye image and the right eye image.

If the process is performed in the imaging device 10, the focal position is not instantly moved during switching of the autofocus control operation. Therefore, influence due to switching of the autofocus control operation noticeably appears in the recorded image and thus an image having a discomfortable feeling is prevented.

4. Fourth Embodiment

Next, a fourth embodiment of the present disclosure will be described. In addition, the imaging device of the fourth embodiment of the present disclosure has the same configuration as the first embodiment of the present disclosure.

In the above-mentioned embodiment of the present disclosure, cases where the detection area of the left eye image and the detection area of the right eye image are fixed are illustrated. However, the imaging device 10 moves the position of the detection area according to the subject distance or the angle of view and thus decreases the difference between the image of the detection area of the left eye image and the image of the detection area of the right eye image. For example, as illustrated in FIG. 9A, it is assumed that the detection area (area indicted by a dashed line) of the left eye image and the detection area of the right eye image (area indicated by a broken line) are fixed. In this case, if the image of the detection area of the left eye image is mainly people and the detection area of the right eye image is mainly background image, the left eye image and the right eye image become the image focused on the different subjects. Therefore, in order for the image of the detection area to become an image coincident with the range of the subject, at least any one position of detection areas of the left eye image and the detection area of the right eye image is adjusted. In addition, FIG. 9B illustrates a case moving the detection area of the right eye image to the detection area of the left eye image (area indicated by a solid line in the center).

If a position of the above-mentioned detection area is adjusted, the autofocus control operation of the left eye image and the right eye image can be independently performed at a wider subject distance range and the zoom range. In addition, if the subject distance is a short distance, the detection area of the left eye image and the detection area of the right eye image coincide with each other, even if the image of the detection area of the left eye image and the image of the detection area of the right eye image have the noticeable difference due to parallax. In this case, the imaging device 10 causes the focal position of the other image to follow the focal position of the one image.

In a specification described above, of the series of processes may be executed using hardware or software or a combination thereof. If the process is executed by software, the process is executed by installing a program in which a processing sequence is recorded to a memory in a computer installed on dedicated hardware. In addition, each process may be executed by installing the program to a general-purpose computer which is able to execute various processes.

For example, the program can be recorded (stored) in advance on a hard disk or ROM (Read Only Memory) as a recording medium. Alternatively, the program can be temporarily or permanently stored (recorded) on removable recording medium such as a flexible disk, a CD-ROM (Compact Disc Read Only Memory) disc, MO (Magneto optical) a DVD (Digital Versatile Disc), a magnetic disk, a semiconductor memory card. Such a removable recording medium can be provided as so-called packaged software.

In addition, in addition to a program being installed on the computer from a removable recording medium, the program may be transferred to the computer in a wireless or wired manner via a network such as a LAN (Local Area Network), the Internet and the like from a download site. The computer receives the transferred program and is able to install the program on the recording medium, such as the embodied hard disk and the like.

In addition, the present disclosure is not interpreted as being limited to the embodiments of the present disclosure. The present of the disclosure discloses this disclosure in the form of an example, it is obvious that those skilled in the art can make modifications and substitutions of the embodiment without departing from the subject matters. That is, in order to determine the subject matter of the present disclosure, the claims should be referred.

In addition, the imaging device has a configuration below.

(1) According to the disclosure, there is provided an imaging device including: a first imaging optical system; a first imaging unit that converts an optical image of a subject formed via the first imaging optical system into an electrical signal and produces an image signal of a first imaged image; a second imaging optical system; a second imaging unit that converts the optical image of the subject formed via a second imaging optical system into an electrical signal and produces an image signal of a second imaged image; and a control unit that independently control the first imaging optical system and the second imaging optical system and individually performs a focus adjustment of the first imaged image and the second imaged image.

(2) The imaging device according to a description (1), when a distance of the subject between the first imaged image and the second imaged image are equal to or greater than a predetermined distance corresponding to an angle of view, the control unit individually performs a focus adjustment of the first imaged image and the second imaged image.

(3) The imaging device according to description (2), when the distance of the subject is not equal to or greater than a predetermined distance corresponding to the angle of view, the control unit allows a focal position of the second imaged image to follow the focal position of the first imaged image.

(4) The imaging device according to description (3), when the focus adjustment of the second imaged image is switched between the independent control and a control following a focus adjustment of the first imaged image, the focus is moved from the focal position of one control to the focal position of the other control at a predetermined speed or less.

(5) The imaging device according to any of descriptions (1) to (4), the imaging device further includes a subject recognition unit that performs a subject recognition based on the image signal of the first imaged image, in which the control unit enables the focus to follow a predetermined subject recognized by the subject recognition unit, the control unit enables the focal position of the second imaged image to follow the focal position of the first imaged image.

(6) The imaging device according to any of descriptions (1) to (5), wherein the control unit sets a focus adjustment range of the second imaged image based on the focal position of the first imaged image.

(7) The imaging device according to any of descriptions (1) to (6), the control unit adjusts any one position of at least a first detection area and a second detection area every the focal position such that the subject range is coincident in an image of the first detection area used in adjusting the focus in the first imaged image and the image of the second detection area used in adjusting the focus in the second imaged image.

The present disclosure contains subject matter related to that disclosed in Japanese Priority Patent Application JP 2011-279579 filed in the Japan Patent Office on Dec. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
a first imaging optical system;
a second imaging optical system; and
circuitry configured to
convert an optical image of a subject formed via the first imaging optical system into an electrical signal and produce an image signal of a first imaged image,
convert an optical image of the subject formed via the second imaging optical system into an electrical signal and produce an image signal of a second imaged image, and
determine, whether to perform individually a focus adjustment of the first imaged image and the second imaged image based on an angle of view calculated from a distance and zoom magnification, and independently control the first imaging optical system and the second imaging optical system, based on the determination that is based on the angle of view and the zoom magnification, wherein
the circuitry is configured to, after the determination whether to perform individually the focus adjustment and in response to the angle of view being lower than a predetermined value, individually perform the focus adjustment of the first imaged image and the second imaged image by independently controlling the first imaging optical system and the second imaging optical system.

2. The imaging device according to claim 1, wherein when distances to the subject between the first imaged image and the second imaged image are equal to or greater than the distance corresponding to an angle of view, the circuitry is configured to individually perform the focus adjustment of the first imaged image and the second imaged image.

3. The imaging device according to claim 2, wherein when the distances to the subject are not equal to or greater than the distance corresponding the angle of view, the circuitry is configured to allow a focal position of the second imaged image to follow a focal position of the first imaged image.

4. The imaging device according to claim 3, wherein when a switching is performed from one side to an other side between an operation that individually performs the focus adjustment of the first imaged image and the second imaged image and an operation that allows the focal position of the second imaged image to follow the focal position of the first imaged image, the circuitry is configured to move the focal position of the second imaged image from the focal position of the operation of the one side to the focal position of the operation of the other side at a predetermined speed or less.

5. The imaging device according to claim 1, wherein the circuitry is further configured to perform subject recognition based on the image signal of the first imaged image, allow the focus to follow a predetermined subject recognized by the circuitry, and enable a focal position of the second imaged image to follow a focal position of the first imaged image.

6. The imaging device according to claim 1, wherein the circuitry is configured to set a focus adjustment range of the second imaged image based on a focal position of the first imaged image.

7. The imaging device according to claim 1, wherein the circuitry is configured to adjust any one position of at least a first detection area and a second detection area such that subject ranges are coincident in an image of the first detection area used in adjusting a focus in the first imaged image and an image of the second detection area used in adjusting a focus in the second imaged image.

8. An autofocus method comprising:
converting, using circuitry, an optical image of a subject formed via a first imaging optical system into an electrical signal and producing an image signal of a first imaged image;
converting, using the circuitry, an optical image of the subject formed via a second imaging optical system into an electrical signal and producing an image signal of a second imaged image;
determining whether to perform individually a focus adjustment of the first imaged image and the second imaged image based on an angle of view calculated from a distance and zoom magnification;
independently controlling the first imaging optical system and the second imaging optical system, based on the determining that is based on the angle of view and the zoom magnification; and
after the determining whether to perform individually the focus adjustment and in response to the angle of view being lower than a predetermined value, individually performing the focus adjustment of the first imaged image and the second imaged image by independently controlling the first imaging optical system and the second imaging optical system.

9. A non-transitory computer-readable storage medium including computer executable instructions, wherein the instructions, when executed by a computer, cause the computer to perform a method, the method comprising:
independently controlling a first imaging optical system and a second imaging optical system;
converting an optical image of a subject formed via the first imaging optical system into an electrical signal to obtain a first imaged image and an optical image of the subject formed via a second imaging optical system into an electrical signal to obtain a second imaged image;
determining whether to perform individually a focus adjustment of the first imaged image and the second imaged image based on an angle of view calculated from a distance and zoom magnification; and
after the determining whether to perform individually the focus adjustment and in response to the angle of view being lower than a predetermined value, performing individually the focus adjustment of the first imaged image and the second image, based on the determining that is based on the angle of view and the zoom magnification, the focus adjustment of the first imaged image and the second imaged image being individually performed by independently controlling the first imaging optical system and the second imaging optical system.

10. The imaging device according to claim 1, wherein the circuitry determines whether to perform individually the focus adjustment of the first imaged image and the second imaged image, at least based on the angle of view and distances to the subject.

11. The imaging device according to claim 10, wherein in a case that distances to the subject between the first imaged image and the second imaged image are equal to or greater than the distance corresponding to the angle of view, the circuitry is configured to individually perform the focus adjustment of the first imaged image and the second imaged image.

12. The imaging device according to claim 1, wherein the circuitry is configured to, after the determination whether to perform individually the focus adjustment and in response to the angle of view being equal to or greater than the predetermined value, cause a focal position of the second imaged image to follow a focal position of the first imaged image.

* * * * *